(12) United States Patent
Goyal et al.

(10) Patent No.: US 11,861,895 B2
(45) Date of Patent: Jan. 2, 2024

(54) HELICOPTER SEARCH LIGHT AND METHOD FOR DETECTION AND TRACKING OF ANOMALOUS OR SUSPICIOUS BEHAVIOUR

(71) Applicant: GOODRICH CORPORATION, Charlotte, NC (US)

(72) Inventors: Nitin Kumar Goyal, Bangalore (IN); Srinivas Sanga, Bangalore (IN)

(73) Assignee: GOODRICH CORPORATION, Charlotte, NC (US)

( * ) Notice: Subject to any disclaimer, the term of this patent is extended or adjusted under 35 U.S.C. 154(b) by 42 days.

(21) Appl. No.: 17/134,440

(22) Filed: Dec. 27, 2020

(65) Prior Publication Data

US 2022/0019759 A1 Jan. 20, 2022

(30) Foreign Application Priority Data

Jul. 16, 2020 (IN) .............................. 202041030433

(51) Int. Cl.
*G06V 20/17* (2022.01)
*G06V 40/10* (2022.01)
(Continued)

(52) U.S. Cl.
CPC ............. *G06V 20/17* (2022.01); *B64D 45/00* (2013.01); *B64D 47/02* (2013.01); *B64D 47/08* (2013.01);
(Continued)

(58) Field of Classification Search
CPC ........ G06V 20/13; G06V 40/10; G06V 40/20; G06V 10/141; G06V 10/25; G06V 20/52;
(Continued)

(56) References Cited

U.S. PATENT DOCUMENTS 354,776 A 12/1886 Fay
8,218,814 B2 7/2012 Ito et al.
(Continued)

FOREIGN PATENT DOCUMENTS

CN 108135064 6/2018
EP 1459272 9/2006
(Continued)

OTHER PUBLICATIONS

Meg Wagner, "Chopper crash kills two Virginia cops near rally site", CNN, https://www.cnn.com/2017/08/12/US/ charlottesville-helicopter-crash/index.html, Updated 2:09 Am Edt, Sun Aug. 13, 2017, pp. 1-2.
(Continued)

*Primary Examiner* — Ming Y Hon
(74) *Attorney, Agent, or Firm* — ISNELL & WILMER L.L.P.

(57) ABSTRACT

A system for detecting and tracking an object that is exhibiting an anomalous behavior from a helicopter is disclosed. The system includes a search light connected to the helicopter; a camera; and a processor including an object detection module coupled to the search light and the camera, the object detection module being configured to receive a plurality of images from the camera, compare the plurality of images against a pattern database, determine the object is exhibiting the anomalous behavior and instruct the search light to point toward the object.

20 Claims, 6 Drawing Sheets

(51) Int. Cl.
| | |
|---|---|
| *G06V 40/20* | (2022.01) |
| *G06T 7/20* | (2017.01) |
| *B64D 47/02* | (2006.01) |
| *B64D 47/08* | (2006.01) |
| *B64D 45/00* | (2006.01) |
| *H04N 5/38* | (2006.01) |
| *G06F 18/22* | (2023.01) |

(52) U.S. Cl.
CPC ............... *G06F 18/22* (2023.01); *G06T 7/20* (2013.01); *G06V 40/10* (2022.01); *G06V 40/20* (2022.01); *H04N 5/38* (2013.01)

(58) Field of Classification Search
CPC ........ G06V 20/17; B64D 45/00; B64D 47/02; B64D 47/08; B64D 47/04; G06K 9/6201; G06T 7/20; H04N 5/38; H04N 7/188; B64C 27/04
See application file for complete search history.

(56) References Cited

U.S. PATENT DOCUMENTS

| | | | |
|---|---|---|---|
| 8,406,464 B2 | 3/2013 | Karazi | |
| 8,699,748 B2 | 4/2014 | Huang | |
| 9,884,691 B2 | 2/2018 | Jha et al. | |
| 9,940,724 B2 | 4/2018 | Jia et al. | |
| 10,089,549 B1* | 10/2018 | Cao | G06V 10/147 |
| 10,136,492 B2 | 11/2018 | Hessling-Von Heimendahl et al. | |
| 10,769,908 B1* | 9/2020 | Burris | G06V 40/10 |
| 11,250,054 B1* | 2/2022 | Campbell | G06V 20/582 |
| 2014/0254865 A1* | 9/2014 | Soubra | G06K 9/6253 382/103 |
| 2015/0279116 A1* | 10/2015 | Yachida | H04N 7/185 345/633 |
| 2016/0231411 A1* | 8/2016 | Kumar | G01S 3/7864 |
| 2016/0283955 A1* | 9/2016 | Terrazas | G06Q 30/0205 |
| 2017/0294089 A1* | 10/2017 | Miwa | G08B 25/005 |
| 2017/0374261 A1* | 12/2017 | Teich | H04N 17/002 |
| 2018/0054875 A1* | 2/2018 | Schoen | H05B 47/11 |
| 2018/0158298 A1* | 6/2018 | Jeong | H04N 5/77 |
| 2018/0189532 A1* | 7/2018 | Bataller | G06F 18/24 |
| 2019/0009904 A1* | 1/2019 | Winkle | G08G 5/025 |
| 2019/0077306 A1* | 3/2019 | Duncan | B60Q 1/0082 |
| 2019/0286876 A1* | 9/2019 | Safavi | G06V 20/17 |
| 2019/0332856 A1* | 10/2019 | Sato | G06V 20/52 |
| 2020/0191946 A1* | 6/2020 | Kalyandurg | G01S 13/955 |
| 2020/0223468 A1* | 7/2020 | Azumi | B61G 1/32 |
| 2021/0016895 A1* | 1/2021 | Das | H04N 23/60 |
| 2021/0063120 A1* | 3/2021 | Taveniku | B64C 39/024 |
| 2021/0192486 A1* | 6/2021 | Uchimura | G07G 3/00 |
| 2021/0209331 A1* | 7/2021 | Grant | G08G 5/0013 |
| 2021/0302195 A1* | 9/2021 | Miura | G01C 21/3878 |
| 2022/0114806 A1* | 4/2022 | Badri | G06V 10/7747 |
| 2022/0198913 A1* | 6/2022 | Thompson | G08B 29/12 |
| 2022/0211026 A1* | 7/2022 | McCann | A01M 21/043 |

FOREIGN PATENT DOCUMENTS

| | | |
|---|---|---|
| EP | 3269596 | 1/2018 |
| JP | 06539073 | 7/2019 |

OTHER PUBLICATIONS

Kyodo, "Police helicopter carrying heart for transplant crashes in Fukushima, injuring seven", The Japan Times, https://www.japantimes.co.jp/news/2020/02/01/national/police-helicopter-crashes-fukushima/# Xpu5RcgzblU, Feb. 1, 2020, pp. 1-2.

European Patent Office, European Search Report dated Dec. 6, 2021 in Application No. 21186112.5.

Prakash Dona et al, "Automatic human tracking theatrical spotlight", 2015 International Conference on Innovations in Information, Embedded and Communication Systems (ICIIECS), IEEE, Mar. 19, 2015 (Mar. 19, 2015), pp. 1-4, XP033192264, DOI: 10.1109/ICIIECS.2015.7192974 ISBN: 978-1-4799-6817-6 [retrieved on Aug. 12, 2015].

Choenil Park et al, "A design for object tracking security system using on LED light combined CCTV", ICT Convergence (ICTC), 2011 International Conference on, IEEE, Sep. 28, 2011 (Sep. 28, 2011), pp. 204-207, XP032011289, DOI: 10.1109/ICTC.2011.6082580 ISBN: 978-1-4577-1267-8.

\* cited by examiner

HELICOPTER SEARCH LIGHT AND METHOD FOR DETECTION AND TRACKING OF ANOMALOUS OR SUSPICIOUS BEHAVIOUR

CROSS-REFERENCE TO RELATED APPLICATIONS

This application claims priority to, and the benefit of, Indian Patent Application No. 202041030433, filed Jul. 16, 2020 and titled "HELICOPTER SEARCH LIGHT AND METHOD FOR DETECTION AND TRACKING OF ANOMALOUS OR SUSPICIOUS BEHAVIOUR," which is incorporated by reference herein in its entirety for all purposes.

FIELD

The present disclosure relates generally to systems and methods used for detecting and tracking anomalous or suspicious behavior of vehicles or humans and, more particularly, to helicopter search lights and related systems and methods used for such detection and tracking the behavior once detected.

BACKGROUND

Helicopters are often equipped with search lights configured to illuminate the environment around the helicopter and, in particular, to illuminate the ground in an area in front of and below the helicopter. Helicopter search lights are particularly useful for establishing situational awareness or for inspecting the ground for potential obstacles, such as, for example, power lines, trees, etc., during nighttime landings or when operating close to the ground.

A helicopter search light is a device that can project a powerful and focused beam of white or infrared light in a particular direction. Helicopter search lights may be used for many purposes, such as, for example, military and policing operations, surveillance operations, and search and rescue operations occurring in difficult geographical terrain or adverse weather conditions. Such lights are typically mounted on the underside or the nose of the helicopter and are adjustable in both intensity and direction. Adjustability in direction is generally accomplished by rotating a light head in the vertical or horizontal directions via direct-current motors coupled to a differential gear box.

Notwithstanding the use of motors, directional control of the search light is typically performed manually via control switches or dials. Thus, if a crew desires to focus a search light on a moving object in order to track the object, the crew is typically required to continually adjust the direction of the beam by continually manipulating the control switches or dials while, at the same time, operating the helicopter. Having to simultaneously control the direction of the search light and the operation of the helicopter may create dangerous situations, particularly when operating in difficult terrain or adverse weather conditions.

SUMMARY

A system for detecting and tracking an object that is exhibiting an anomalous behavior from a helicopter is disclosed. In various embodiments, the system includes a search light connected to the helicopter; a camera; and a processor including an object detection module coupled to the search light and the camera, the object detection module being configured to receive a plurality of images from the camera, compare the plurality of images against a pattern database, determine the object is exhibiting the anomalous behavior and instruct the search light to point toward the object.

In various embodiments, the system further includes a display module configured to display the plurality of images. In various embodiments, the system further includes an alert module configured to indicate detection of the object. In various embodiments, the system further includes an input module configured to input to the object detection module a geographic region identifier and an object identifier. In various embodiments, the geographic region identifier is at least one of a highway, an international boundary, a residential area or a water body. In various embodiments, the object identifier is at least one of a human, an automobile, a fire or smoke.

In various embodiments, the camera is a video-camera configured to generate an input video stream for transmitting to the object detection module. In various embodiments, the system further includes an object tracking module configured to point the search light toward the object based on instructions received by the object detection module. In various embodiments, the pattern database includes a lookup table configured to store a feature of the object and to recognize the object via the object detection module following a reappearance of the object having previously left a field of view of the camera. In various embodiments, the search light includes a first plurality of light sources configured to operate in a spotlight mode and a second plurality of light sources configured to operate in a floodlight mode.

A method for detecting and tracking an object that is exhibiting an anomalous behavior from a helicopter is disclosed. In various embodiments, the method includes orienting a camera toward a region of interest; receiving, via a processor including an object detection module, a plurality of images from the camera; comparing the plurality of images against a pattern database included within the object detection module; determining, via the object detection module, the object is exhibiting the anomalous behavior; and instructing, via the object detection module, a search light to point toward the object.

In various embodiments, the method further includes displaying via a display module the plurality of images. In various embodiments, the method further includes alerting via an alert module a detection of the object. In various embodiments, the method further includes inputting to the object detection module via an input module a geographic region identifier and an object identifier. In various embodiments, the geographic region identifier is at least one of a highway, an international boundary, a residential area or a water body. In various embodiments, the object identifier is at least one of a human, an automobile a fire or smoke.

In various embodiments, the camera is a video-camera configured to generate an input video stream for transmitting to the object detection module. In various embodiments, an object tracking module is configured to point the search light toward the object based on instructions received by the object detection module. In various embodiments, the pattern database includes a lookup table configured to store a feature of the object and to recognize the object via the object detection module following a reappearance of the object having previously left a field of view of the camera. In various embodiments, the search light includes a first plurality of light sources configured to operate in a spotlight mode and a second plurality of light sources configured to operate in a floodlight mode.

The forgoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The accompanying drawings illustrate various embodiments employing the principles described herein and are a part of the specification. The illustrated embodiments are meant for description and not to limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Figure 1:
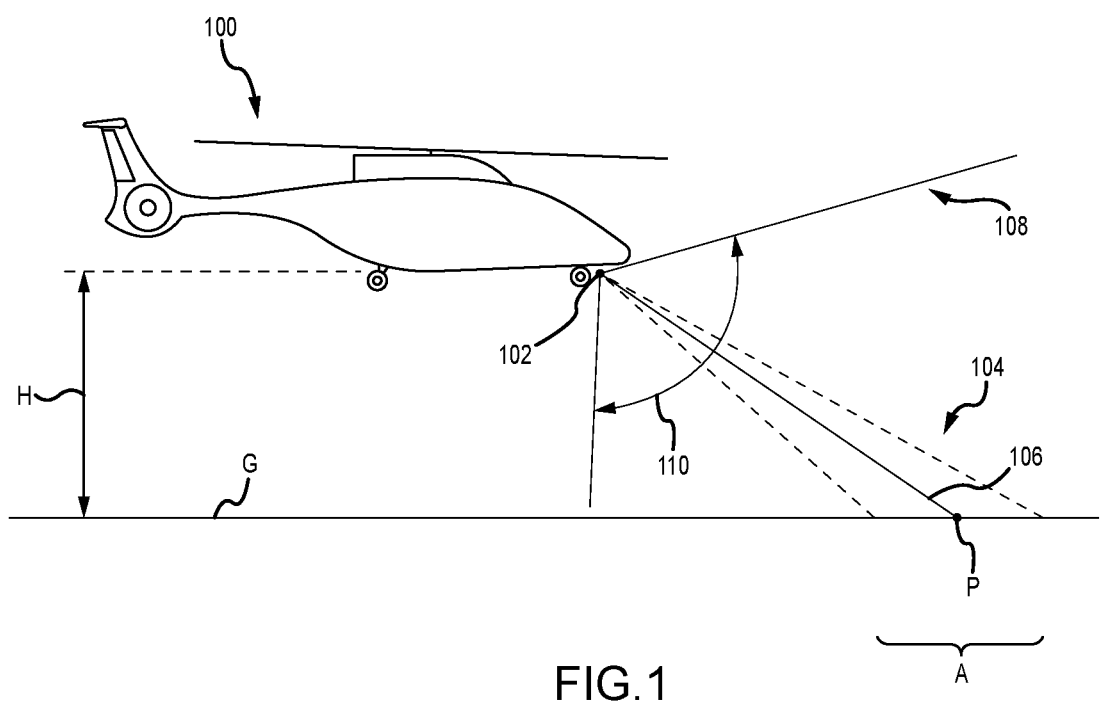
FIG. 1 illustrates a helicopter having a helicopter search light, in accordance with various embodiments.

With reference now to FIG. 1, a helicopter 100 flying at a height H above the ground G is illustrated. In accordance with various embodiments, the helicopter 100 is equipped with a helicopter search light 102, which is mounted to a front and bottom portion of the helicopter 100. The helicopter search light 102 comprises a lighting arrangement having an adjustable light output. In various embodiments, for example, the lighting arrangement of the helicopter search light 102 may have two modes of operation: a floodlight mode and a spotlight mode. The spotlight mode is sometimes called a search mode or a pencil mode.

When operated in the spotlight mode, a narrow beam of light 104, as schematically illustrated by the dashed lines in FIG. 1, is emitted from the helicopter search light 102. The pilot may thus inspect the ground within an area A about a center position P where a main light emission direction 106 meets the ground. In the spotlight mode, the light emitted by the helicopter search light 102 is bundled along the main light emission direction 106. As a result, the ground is brightly illuminated within the area A, which is located about the center position P, allowing for a close and thorough inspection of the ground G or of an object on the ground G that is within the area A.

When operated in the floodlight mode, a wide beam of light 108, as schematically illustrated by the solid lines in FIG. 1, is emitted from the helicopter search light 102. As illustrated, the cone of light resulting from the floodlight mode is much broader than the cone of light resulting from the spotlight mode, with both cones of light still defining a main light emission direction 106 at the centers of the cones. In various embodiments, the cone of light resulting from the floodlight mode may have an opening angle of about one-hundred degrees (100°), which is indicated by the angle sweep 110 shown in FIG. 1. When using the floodlight mode, the pilot may inspect a larger portion of the environment outside the helicopter 100 than when using the spotlight mode. However, when using the floodlight mode, the lighting power of the helicopter search light 102 is distributed over a larger angular region than when in the spotlight mode and, thus, the luminance of the ground G is considerably less than when using the spotlight mode. Consequently, the floodlight mode is typically employed when the helicopter 100 is flying at a height H not greater than about twenty to thirty meters (20-30 m), which may be considered relatively close to the ground G.

Figure 2A:
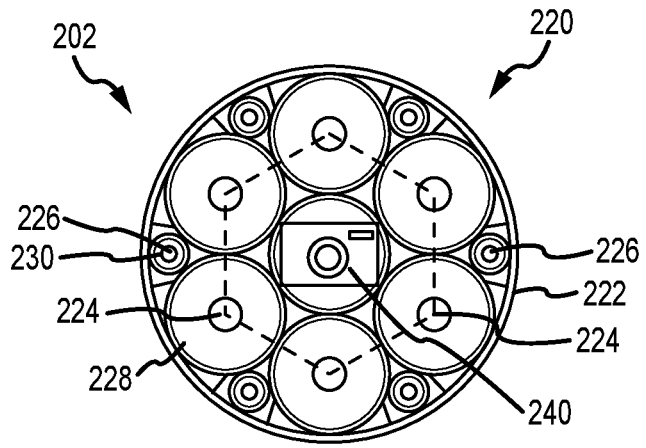
FIGS. 2A and 2B illustrate top views of a helicopter search light having a camera mounted thereon, in accordance with various embodiments.
Figure 2B:
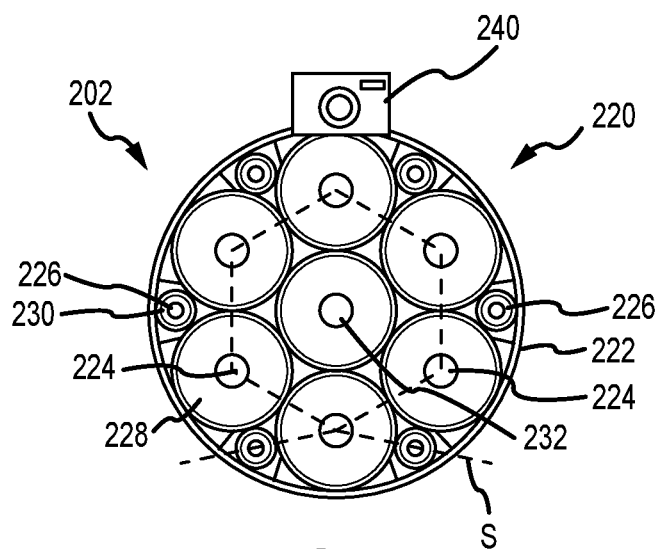
Figure 2C:
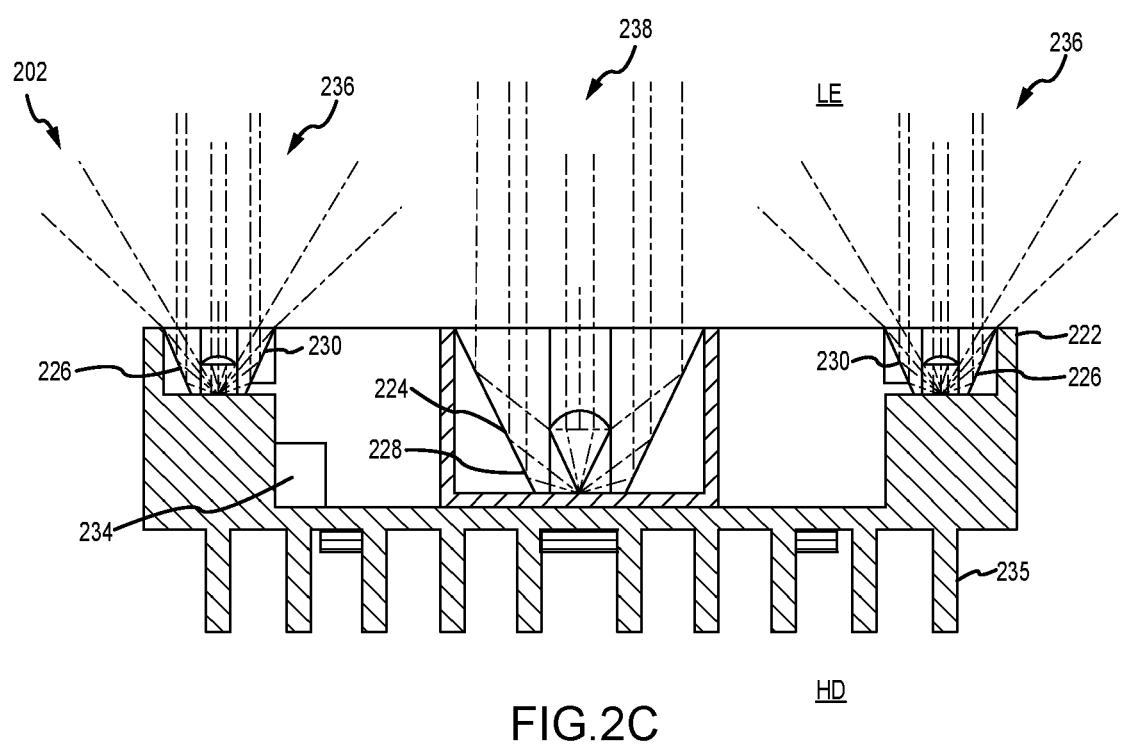
FIG. 2C illustrates a side view of a helicopter search configured to have a camera mounted thereon, in accordance with various embodiments.

Referring now to FIGS. 2A, 2B and 2C, top and side views of a helicopter search light 202, similar to the helicopter search light 102 described above, are illustrated. In various embodiments, the helicopter search light 202 includes a light head 220 having a housing in the form of a cylindrical side wall 222. The light head 220 further includes a first plurality of light sources 224 and a second plurality of light sources 226 that are spaced apart and arranged in a pattern (e.g., a circular pattern or a hexagonal pattern where the numbers of light sources equals six, as illustrated) within the light head 220. Each of the first plurality of light sources 224 is associated with a first optical system 228 and each of the second plurality of light sources is associated with a second optical system 230.

In various embodiments, each of the first plurality of light sources 224 that are associated with the first optical system 228 are of identical design and positioned at the corners of a first equilateral hexagon, which is indicated by dashed lines in FIGS. 2A and 2B. Similarly, each of the second plurality of light sources 226 that are associated with the second optical system 230 are of identical design and positioned at the corners of a second equilateral hexagon that is positioned radially outward of the first equilateral hexagon. As illustrated, each of the second plurality of light sources 226 is packed between adjacent pairs of the first plurality of light sources 224 and the cylindrical side wall 222 of the light head 220. In various embodiments, the first plurality of light sources 224 associated with the first optical system 228 is configured for providing the spotlight mode of operation, while the second plurality of light sources 226 associated with the second optical system 230 is configured for providing the floodlight mode of operation. As will be appreciated, the disclosure contemplates other arrangements of the various pluralities of light sources within the light head 220. For example, as illustrated in FIG. 2B, the light head 220 may include an auxiliary light source 232 centrally positioned within the first plurality of light sources 224. In various embodiments, the auxiliary light source 232 may be associated with either of the first optical system 228 or the second optical system 230, or it may be associated with a third optical system that is separate from the first and second optical systems.

Referring now primarily to FIG. 2C, a cross-sectional side view of the light head 220, taken along the cross-sectional plane S indicated in FIG. 2B, is illustrated. The light head 220 has a light emission side LE, depicted as the top side of the cross-sectional plane S, and a heat discharge side HD, depicted as the bottom side of the cross-sectional plane S. At the heat discharge side, the light head 220 includes a cooling rib structure 235 configured to provide a heat sink for the first and second pluralities of light sources. As further illustrated, each of the first plurality of light sources 224 comprises a collimating lens or a collimating reflector configured to generally focus the light in a beam for the spotlight mode of operation. Conversely, each of the second plurality of light sources 226 do not include a collimator, and thus are configured to emit light in more of a spherical or cone-shaped manner for the floodlight mode of operation. In various embodiments, each of the first plurality of light sources 224 and each of the second plurality of light sources 226 comprise light emitting diodes (LEDs) that are configured to emit white light in the visible light range—e.g., light that is visible to the human eye. In various embodiments, one or more of the first plurality of light sources 224 or the second plurality of light sources 226 may also be configured for emitting infrared or ultraviolet light.

Still referring to FIGS. 2A-2C, the light head 220 includes a viewing system 240. In various embodiments, the viewing system 240 may be positioned at a central location within the light head 220, as illustrated at FIG. 2A, or the viewing system 240 may be positioned at a peripheral location (e.g., attached to the cylindrical side wall 222) as illustrated at FIG. 2B. In various embodiments, the viewing system 240 comprises a video-camera configured to capture and transmit on the order of thirty frames per second (30 fps) or greater. Further, in various embodiments, the light head 220 includes a controller 234 (see FIG. 2C), which may be integrated within the light head 220, as illustrated, or positioned within the helicopter. The controller 234 typically includes a switching circuit that is electrically coupled to an electrical power source, as well as to each of the first plurality of light sources 224 and each of the second plurality of light sources 226. The switching circuit allows for selectively switching the first plurality of light sources 224 and the second plurality of light sources 226 on and off and for selectively switching between the spotlight mode and the floodlight mode or a combination of the two modes. In various embodiments, the controller 234 is also configured to operate the viewing system 240—e.g., to turn the viewing system 240 on and off or to select various viewing parameters, such as, for example, focal length and frame speed. Further, in various embodiments, the controller 234 is configured to adjust or rotate the field of view of the viewing system 240, which, in various embodiments, is on the order of at least seventy degrees (70°) in the horizontal and at least sixty degrees (60°) in the vertical. Rotating the field of view may be accomplished, for example, by reorienting or rotating the main light emission direction 106 of the helicopter search light to which the viewing system 240 is attached or by reorienting or rotating the viewing system 240 independent of the helicopter search light. In various embodiments, the controller 234 may include a general-purpose processor, a digital signal processor (DSP), an application specific integrated circuit (ASIC), a field programmable gate array (FPGA) or some other programmable logic device, discrete gate or transistor logic, discrete hardware components, or any combination thereof.

Figure 3:
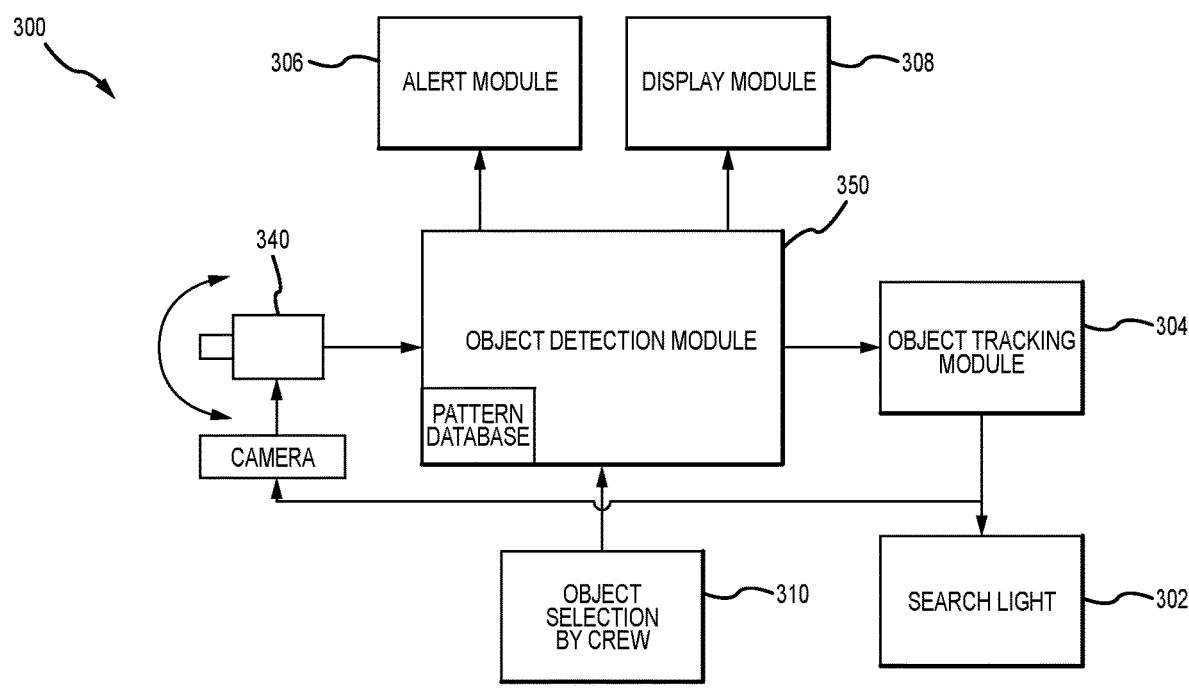
FIG. 3 illustrates a system used for detecting and tracking anomalous or suspicious behavior using a helicopter equipped with a search light and camera, in accordance with various embodiments.

Referring now to FIG. 3, a system 300 for detecting and tracking an object from a helicopter, such as the helicopter 100 described above with reference to FIG. 1, is illustrated. In various embodiments, the system includes a helicopter search light 302, similar to the helicopter search light 202 described above with reference to FIGS. 2A-2C, and a viewing system 340, similar to the viewing system 240 described above with reference to FIGS. 2A and 2B. In various embodiments, the viewing system 340 is configured to capture and transmit a plurality of images or a video stream of images of a region of interest or one or more objects within the region of interest. The system 300 further includes an object detection module 350 that includes a pattern database, an object tracking module 304, an alert module 306, a display module 308 and an object selection module 310. In various embodiments, the object detection module 350 is configured to detect anomalous or suspicious behavior based on data stored within the pattern database. By way of example, while the helicopter is traveling along or proximate a highway or an interstate, the helicopter search light 302 and the viewing system 340 may be aimed in the general direction of the highway or the interstate. Data obtained from the viewing system 340 is transmitted to the object detection module 350 and analyzed against various anomalous scenarios stored within the pattern database. If, for example, a vehicle is traveling on the highway or the interstate in the wrong direction or if a person is walking across the highway or the interstate and in danger of being struck by a vehicle, the object detection module will provide a signal to the alert module 306, which will then alert the pilot (e.g., via an audible or visual signal) of the anomalous behavior or scenario. At the same time, a visual depiction of the anomalous behavior or scenario is displayed via the display module 308. The pilot then has the choice to select for tracking the object exhibiting the anomalous behavior or scenario via an input to the object selection module 310. If the pilot elects to track the object, then the object tracking module 304 is activated and continuously moves the helicopter search light 302 and the viewing system 340 such that they both remain aimed at the object or objects being tracked.

Figure 4A:
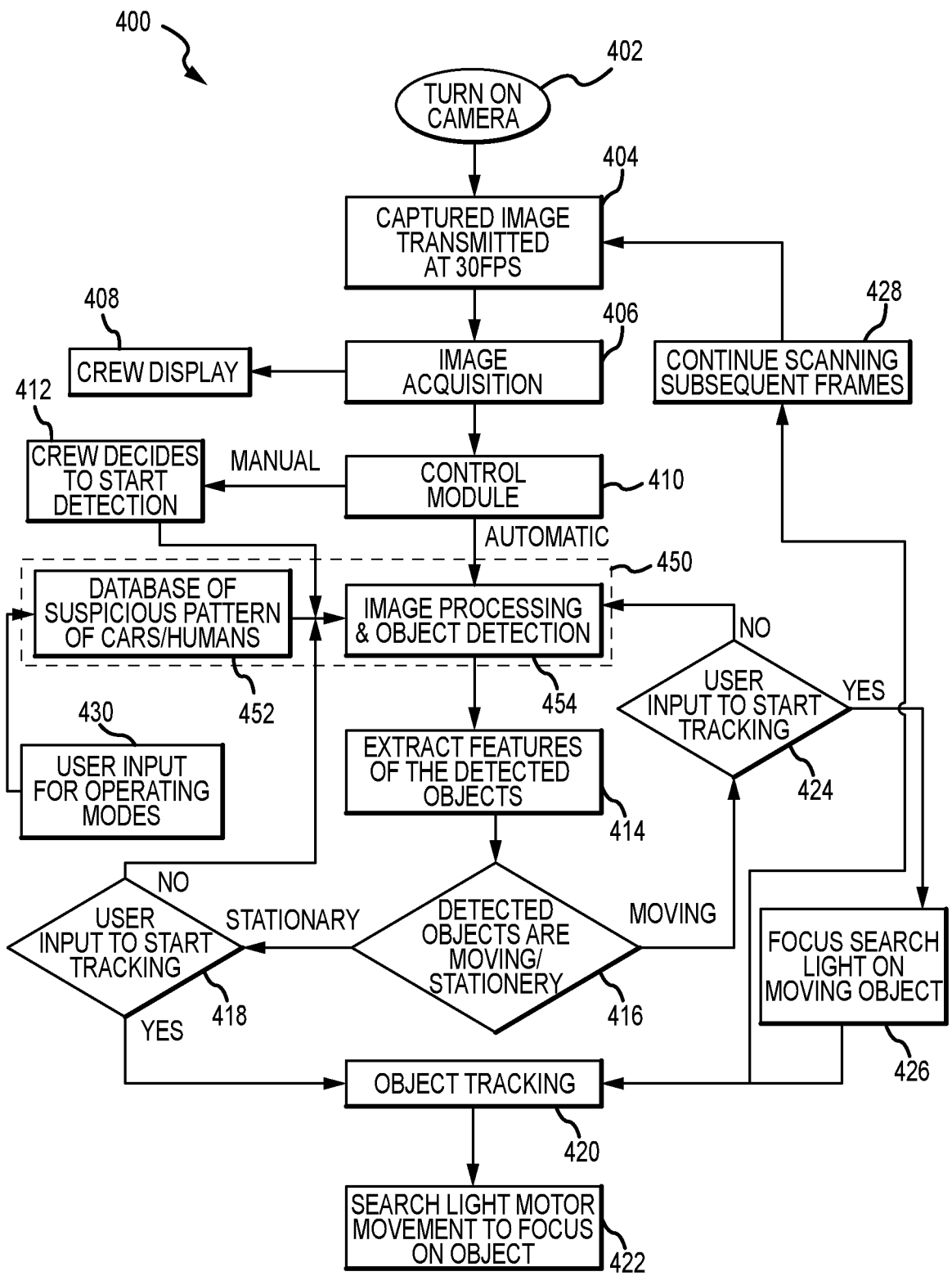
FIGS. 4A and 4B illustrate a flowchart describing a method used for detecting and tracking anomalous or suspicious behavior using a helicopter equipped with a search light and camera, in accordance with various embodiments.
Figure 4B:
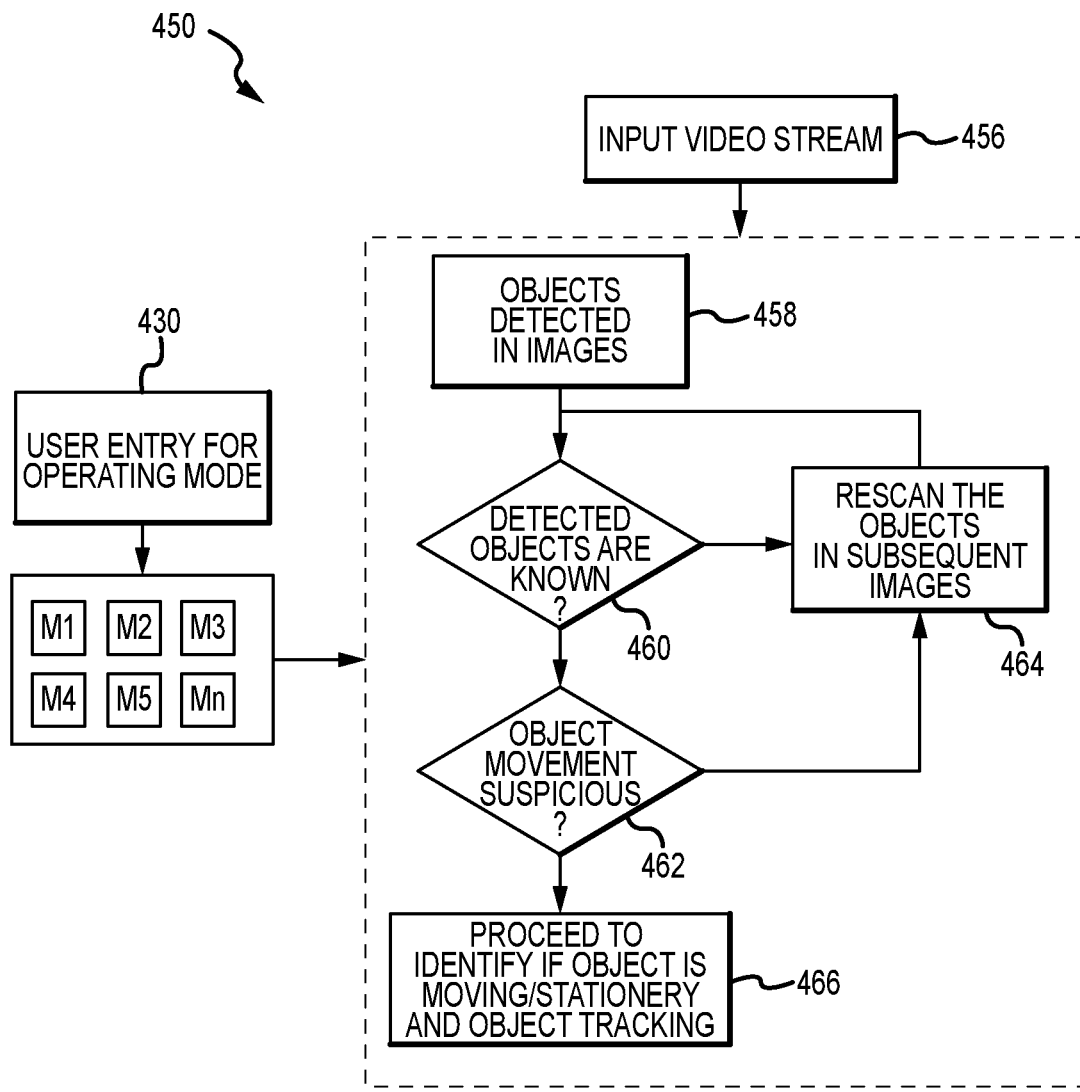

Referring now to FIGS. 4A and 4B, flowcharts are provided that more fully describe operation of a system 400 for detecting and tracking an object from a helicopter, similar to the system 300 described above with reference to FIG. 3. At step 402, a viewing system, such as, for example, a video-camera is turned on and oriented toward an area of interest. At step 404, the viewing system captures and transmits images of the area of interest at a rate equal to at least thirty frames per second (30 fps). As noted above, in various embodiments, a field of view of the viewing system is on the order of at least seventy degrees (70°) in the horizontal and at least sixty degrees (60°) in the vertical. At step 406, the images are acquired and transmitted to a crew display unit 408 and to a control module 410. If the control module 410 is set to manual, then the helicopter crew decides whether or not to detect any anomalous or suspicious activity occurring within the area of interest at step 412. If a decision is made to detect anomalous or suspicious activities, then the images are transmitted to an object detection module 450, similar to the object detection module 350 described above with reference to FIG. 3. If the control module 410 is set to automatic, then the images are transmitted to the object detection module 450 without input from the helicopter crew. The object detection module 450, as discussed further below, includes a pattern database 452 and a processor 454 configured to process the images and to make comparisons of the images against data within the pattern database 452.

At step 414, features of the objects detected within the area of interest (e.g., an automobile or a human) are identified and extracted. At step 416, a determination is made as to whether the object is stationary or moving. If the object is stationary, then a decision is made whether or not to track the object at step 418. If the decision is to not track the object, then the system 400 returns to the object detection module 450 and continues as described above. If the decision is to track the object, then an object tracking module 420 is activated. The object tracking module, similar to the object tracking module 304 described above with reference to FIG. 3, controls movement of a helicopter search light such that it remains aimed at the object being tracked. In similar fashion, if the object is moving, then a decision is made whether or not to track the object at step 424. If the decision is to not track the object, then the system 400 returns to the object detection module 450 and continues as described above. If the decision is to track the object, then the helicopter search light is focused on the object at step 426 and the object tracking module 420 is activated and controls movement of the helicopter search light and the viewing system, at step 422, such that both remain aimed at the object being tracked. At the same time, because the object is moving, the system continues operation of the viewing system at step 428. The various steps repeat sequentially until the helicopter crew halts tracking. A user may also manually input various modes of operation at step 430 via an input module.

Referring more particularly to FIG. 4B, and with continued reference to FIG. 4A, further details of the object detection module 450 are provided. In various embodiments, the object detection module 450 receives an input video stream at step 456. The input video stream is provided, for example, following the image acquisition at step 406 in FIG. 4A. The input video stream is analyzed at step 458 for any objects displaying anomalous or suspicious behavior. In various embodiments, the detection may be made by comparing the input video stream against the pattern database 452. Any objects detected are further analyzed at step 460 to determine whether the objects are known to currently not be anomalous or suspicious. If known to currently not be anomalous or suspicious, the objects are rescanned and reanalyzed, at step 464, following receipt of subsequent images received from the input video stream. If, on the other hand, the objects detected are not known to currently not be anomalous or suspicious, then the objects are further analyzed at step 462. If this further analysis determines an object is acting in an anomalous of suspicious behavior, then the system 400 proceeds with tracking at step 466 as described above with reference to FIG. 4A. If, on the other hand, the further analysis determines an object is not acting in an anomalous of suspicious behavior, then the objects are rescanned and reanalyzed, at step 464.

Operation of the object detection module 450 is based on various machine learning models or deep learning models configured to detect the presence of anomalous or suspicious behavior or activity. The various machine learning models may comprise, for example, a Viola-Jones object detection model, a scale-invariant feature transformation model, or a histogram of oriented gradients model. The various deep learning models may comprise, for example, a You Only Look Once (YOLO) model, any of the class of region proposal models (e.g., R-CNN, Fast R-CNN, Faster R-CNN or Cascade R-CNN) or various neural network models, including, for example, a single-shot refinement neural network for object detection model. The resulting system is thus self-learning, meaning the pattern database 452 is continually updated through each operation. Initial operation of the system may employ pre-defined image data sets compiled from various sources (e.g., photographs taken from online sources). The pre-defined image data sets may be categorized with reference to different geographic regions, such as, for example, an urban residential area, a rural area, a forest, a water body, a highway, an international boundary or border, etc. With each use of the system, the image data sets may be updated for the different geographic regions based on where the system is being operated. During or prior to operation, inputs to the system (e.g., via the user input at step 430) may include selection of a data set corresponding to a specific geographic region (e.g., a highway) and selection of a specific type of object being considered for detection and tracking (e.g., a human crossing or an automobile traveling on the highway). Selection of the geographic region and the object being considered may be referred to as a geographic region identifier and an object identifier, respectively, both of which may be entered into the system via an input module at step 430. Additionally, the object detection module 450 may be configured to include a lookup table (e.g., within the pattern database) for each object marked for tracking, thereby enabling a resumption of tracking in the event an object is lost from the current field of view of the viewing system (e.g., a human or an automobile becomes positioned under a bridge or within a tunnel for a period of time). In such embodiments, the system may be configured to continue tracking various other objects until the object lost from the current field of view reappears, at which point all objects may be tracked.

By way of examples, the system may be used to detect and track a vehicle moving in an incorrect direction or in a suspicious manner (e.g., weaving in and out of lanes or traveling at an excessive rate of speed) on a highway. More specifically, the helicopter crew may start the system (e.g., start the video-camera) and input a highway and an automobile as operating modes. The captured images are transmitted to the object detection module 450 to detect the automobile exhibiting anomalous or suspicious behavior. Once detected, the helicopter crew is alerted and a decision is made whether to track the automobile. If the decision is made to track the automobile, additional characteristics (e.g., color and model of the automobile and travel direction) are stored within the pattern database, either permanently or temporarily.

In a similar example, the system may be used to detect and track one or more humans exhibiting suspicious activities. The helicopter crew may input a geographic region (e.g., a highway) and a human as operating modes. The captured images are transmitted to the object detection module 450 to detect one or more humans exhibiting anomalous or suspicious behavior (e.g., crossing or walking along a highway). Once detected, the helicopter crew is alerted and a decision is made whether to track the one or more humans. If the decision is made to track the one or more humans, additional characteristics (e.g., color of cloths and physical features) are stored within the pattern database, either permanently or temporarily. Similar examples may be made with respect to other geographic regions (e.g., international borders to detect illegal crossings or urban areas to monitor the movements of individuals exhibiting illegal behavior).

Examples of relatively stationary objects include detection of tracking of large groups of individuals or accident sites. For example, where large numbers of individuals are present (e.g., large protests), appropriate operational modes may be selected according to geographic region and the movement of individuals or groups of individuals may be tracked for suspicious behavior within the larger group of individuals (e.g., groups of individuals approaching police or property under protection). Similarly, the system may be used to detect and track various elements at the scenes of accidents, where objects such as fire, smoke, fire trucks or ambulances may be detected, thereby alerting the helicopter crew of a potential accident site.

The above disclosure provides a method for detecting and tracking an object that is exhibiting an anomalous behavior from a helicopter and a system for accomplishing the same, the anomalous behavior typically being exhibited by, for example, humans or automobiles, whether stationary or moving. Various benefits of the disclosure include a reduction of crew required to operate a helicopter and a reduction in distractions to the crew while operating the helicopter. The disclosure also provides a low cost solution for operating a helicopter search light and an easily mountable viewing system for use in conjunction with the helicopter search light. The systems disclosed herein may be retrofitted to existing helicopters without extensive modifications to existing hardware or software and may be readily upgraded as improvements to machine learning models or deep learning models are made.

The system and methods described herein may be described in terms of functional block components, screen shots, optional selections, and various processing steps. It should be appreciated that such functional blocks may be realized by any number of hardware or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, JAVA®, VBScript, COBOL, MICROSOFT® Active Server Pages, assembly, PERL®, PHP, PYTHON®, Visual Basic, SQL Stored Procedures, PL/SQL, any UNIX® shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like.

The various system components discussed herein may also include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; or like data useful in the operation of the system. As those skilled in the art will appreciate, users computer may include an operating system (e.g., WINDOWS®, UNIX®, LINUX®, SOLARIS®, MACOS®, etc.) as well as various conventional support software and drivers typically associated with computers.

Benefits, other advantages, and solutions to problems have been described herein with regard to specific embodiments. Furthermore, the connecting lines shown in the various figures contained herein are intended to represent exemplary functional relationships or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 10%, within 5%, within 1%, within 0.1%, or within 0.01% of a stated value. Additionally, the terms "substantially," "about" or "approximately" as used herein represent an amount close to the stated amount that still performs a desired function or achieves a desired result. For example, the term "substantially," "about" or "approximately" may refer to an amount that is within 10% of, within 5% of, within 1% of, within 0.1% of, and within 0.01% of a stated amount or value.

In various embodiments, system program instructions or controller instructions may be loaded onto a tangible, non-transitory, computer-readable medium (also referred to herein as a tangible, non-transitory, memory) having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media that were found by In Re Nuijten to fall outside the scope of patentable subject matter under 35 U.S.C. § 101.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed:

1. A system for detecting and tracking an object from a helicopter, comprising:
   a search light connected to the helicopter;
   a camera coupled to the search light; and
   a processor integrated within the search light and coupled to the camera,
   wherein the processor is configured to receive an input indicating at least one operation mode indicating at least one of a geographic region or a type of an object corresponding to the object, receive a video stream from the camera, compare the video stream against a pattern database, determine the object is exhibiting an anomalous behavior based on the comparison of the video stream against various anomalous scenarios stored within the pattern database, and instruct the search light to point toward the object, and
   wherein the processor is further configured to continuously track the object in response to selecting the object for tracking.

2. The system of claim 1, wherein the processor is further configured to display the video stream.

3. The system of claim 2, wherein the processor is further configured to indicate detection of the object.

4. The system of claim 3, wherein the processor is further configured to receive a geographic region identifier and an object identifier.

5. The system of claim 4, wherein the geographic region identifier is at least one of a highway, an international boundary, a residential area or a water body.

6. The system of claim 4, wherein the object identifier is at least one of a human, an automobile, a fire or smoke.

7. The system of claim 1, wherein the camera is a video-camera configured to generate an input video stream for transmitting to the processor.

8. The system of claim 7, wherein the pattern database includes a lookup table configured to store a feature of the object and to recognize the object via the processor following a reappearance of the object having previously left a field of view of the camera.

9. The system of claim 8, wherein the search light includes a first plurality of light sources configured to operate in a spotlight mode and a second plurality of light sources configured to operate in a floodlight mode.

10. The system of claim 1, wherein the processor is further configured to continually update the pattern database in response to receiving the video stream from the camera and the determining the object is exhibiting the anomalous behavior.

11. A method for detecting and tracking an object from a helicopter, comprising:
    orienting, by a processor integrated within a search light and coupled to a camera, the camera toward a region of interest;
    receiving, by the processor, an input indicating at least one operation mode indicating at least one of a geographic region or a type of an object corresponding to the object;
    receiving, by the processor, a video stream from the camera;
    comparing, by the processor, the video stream against a pattern database;
    determining, by the processor, the object is exhibiting an anomalous behavior based on the comparison of the video stream against various anomalous scenarios stored within the pattern database;
    instructing, by the processor, the search light to point toward the object; and
    instructing, by the processor, continuous tracking of the object.

12. The method of claim 11, further comprising displaying, by the processor, the video stream.

13. The method of claim 12, further comprising alerting, by the processor, a detection of the object.

14. The method of claim 13, further comprising inputting to the processor a geographic region identifier and an object identifier.

15. The method of claim 14, wherein the geographic region identifier is at least one of a highway, an international boundary, a residential area or a water body.

16. The method of claim 14, wherein the object identifier is at least one of a human, an automobile a fire or smoke.

17. The method of claim 11, wherein the camera is a video-camera configured to generate an input video stream for transmitting to the processor.

18. The method of claim 17, wherein the processor is further configured to point the search light toward the object based on instructions received by the processor.

19. The method of claim 18, wherein the pattern database includes a lookup table configured to store a feature of the object and to recognize the object via the processor following a reappearance of the object having previously left a field of view of the camera.

20. The method of claim 19, wherein the search light includes a first plurality of light sources configured to operate in a spotlight mode and a second plurality of light sources configured to operate in a floodlight mode.

* * * * *